Oct. 25, 1960  W. H. FLANAGAN, JR  2,958,065
ELECTRICAL ASSEMBLY
Filed March 17, 1959
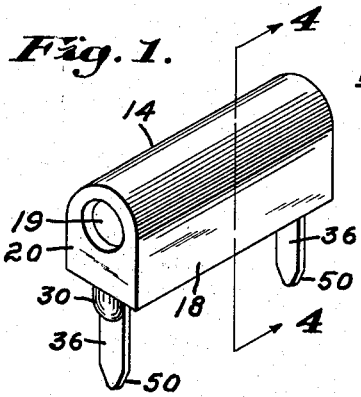
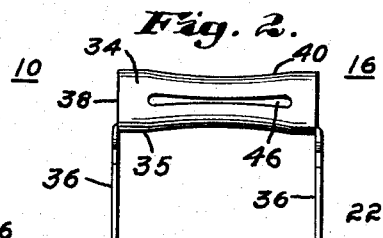
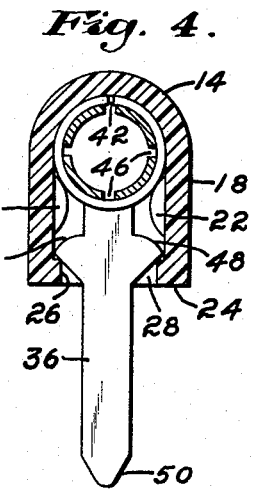
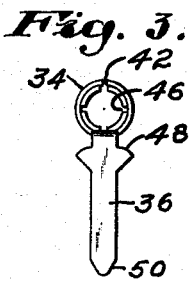
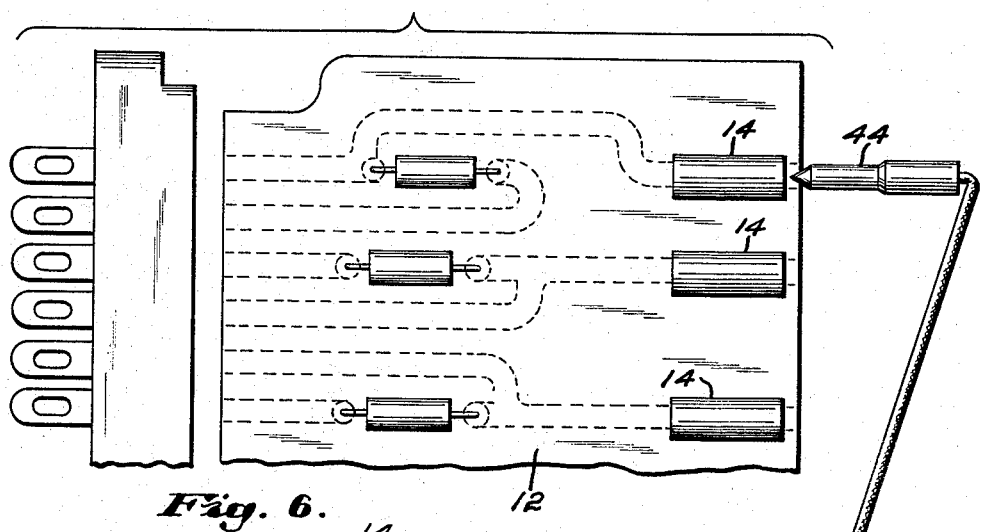
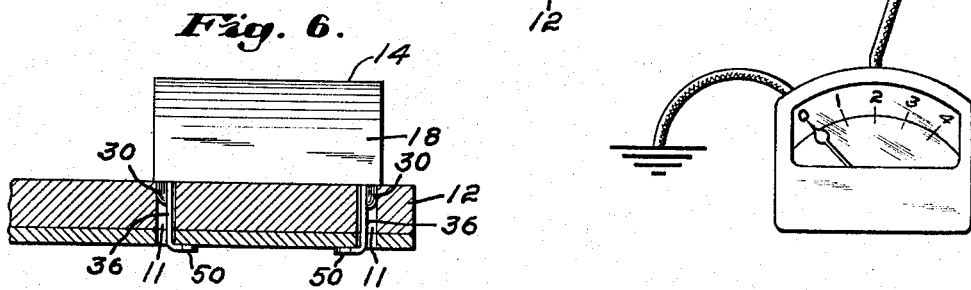
Inventor:
William H. Flanagan Jr.,
by James B. Tiffany Jr.
Atty.

United States Patent Office 2,958,065
Patented Oct. 25, 1960

2,958,065

ELECTRICAL ASSEMBLY

William H. Flanagan, Jr., 50 Shore Road, Wellesley, Mass.

Filed Mar. 17, 1959, Ser. No. 799,993

5 Claims. (Cl. 339—17)

This invention pertains generally to an electrical assembly and particularly to a test jack for use with printed circuits.

Recent developments in the electronic industry have resulted in the miniaturization of sub-assemblies and compactness in installation of these assemblies within a unit. The prime example of this is the multi-layer positioning of printed circuits into stacks wherein the only components visible are those near the edges of each layer. Since the electrical connections of each sub-assembly must be checked as part of the entire assembly, adaptor cards having a suitable edge connector positioned at one end have heretofore been used to continue the electrical circuit but to displace the sub-assembly away from the layers and permit access to components. As the edge connectors are usually provided with polarizing keys, individual adaptor boards had to be stocked for each sub-assembly and this, coupled with the errors in meter readings due to the added resistance, made the testing operation cumbersome and impractical.

The object of this invention is to provide a test jack for printed circuit boards which is of simple and economical construction.

Another object of this invention is to provide a test jack for use on printed circuit boards which is permanently assembled near one end and which is readily accessible to a test probe.

A further object is to provide a color coded test jack for use in printed circuits for use in testing sub-assemblies.

Other objects of the invention will, in part, be obvious, and will, in part, appear hereinafter.

In the drawing:

Fig. 1 is a view in perspective of the test jack assembly embodying the features of my invention;

Fig. 2 is a view in side elevation of the resilient contact;

Fig. 3 is an end view of the contact as shown in Fig. 2;

Fig. 4 is an enlarged view in section of the test jack assembly taken on line 4—4 of Fig. 1;

Fig. 5 is a plan view of a printed circuit board with the test jacks in assembly;

Fig. 6 is an enlarged view in side elevation, partly in section of a printed circuit board having a test jack assembled therewith.

Referring to the drawings, there is illustrated a test jack assembly 10 adapted for insertion into apertures 11 on a printed circuit board 12. The test jack 10 is a two piece assembly including an outer insulating shell 14 which is adapted to encapsulate a conducting member 16. The outer insulating shell 14 may be molded from any suitable insulating material which is sufficiently resilient to enter into snap engagement with the contact 16. One type of material which I have used successfully is a polyamide known commercially as nylon.

The shell 14 is of generally cylindrical form and comprises an open bottomed hollow structure with downwardly depending side walls 18 spaced from each other a distance equivalent to the diameter of said contact 16 and end walls having apertures 19 formed therein, spaced from each other a distance greater than the length of said contact 16. Projections 22 are formed in the inner surface of the side walls 18 for a purpose to be described hereinafter. The terminal ends 24 of the side walls 18 are directed inwardly toward each other defining shoulders 26 which restrict the opening 28. Tongues 30 which extend downwardly from the end walls 20 are adapted for engagement into apertures 11 in the printed circuit board 12.

The contact member 16 is formed from a resilient conducting material and is of one piece construction. It is formed in the shape of an open ended hollow cylinder 34 with dependent legs 36 extending downwardly from the ends 38 of the cylinder base 36. The upper surface 40 of the cylinder 34 is bifurcated by a longitudinal slit 42 to provide a flexing action for a more effective electrical contact upon the insertion of the probe 44. A series of longitudinal slots 46 are formed in the lateral surface of the cylinder and spaced from each other to further aid the inherent resiliency of the contact in accommodating the probe 44. The legs 36 have outwardly extending arcuate portions 48 formed intermediate the cylinder base 35 and the terminal ends 50 with the lower portions of the arcuate portion 48 tapered to meet the legs 36.

To assemble the contact 16 with the shell 10 the open ended cylinder 34 is inserted within the open bottomed hollow structure so that it abuts the projections 22. By exerting an upward pressure the inherent resilient characteristics of the shell allow it to flex, widening the lateral distance between the projection 22 and simultaneously the cylinder 34 by virtue of the longitudinal slot 42 contracts sufficiently to permit passage of the contact 16 past the projections 22. It will readily be seen by referring to Fig. 4 that after the contact 16 has moved beyond the projections 22, the shell 10 and the contact 16 will return to the normal form with the arcuate portion 48 cooperating with shoulders 26 of the side walls 18 in conjunction with the projections 22 retaining the contact 16 in assembly. The relative dimensions of the shell 14 and the contact member 16 are such that when the contact is positioned within the shell the apertures 19 are aligned with the open end of the tubular contact member 16 permitting free insertion of the probe 44.

Installation of the test jack assembly 10 on the printed circuit board 12 is accomplished as illustrated in Fig. 6 where the legs 36 are inserted through preformed apertures 11 on the board 12 and crimped over on the under surface of the board where they may be dip soldered if so desired. Furthermore, it will be seen that the tongues 30 of the outer insulating shell 14 slide into the apertures 11 and act as a strain relief for the contact 16 to prevent strain on the legs 36 when the probe 44 is inserted.

Since certain other obvious modifications may be made in this device without departing from the scope of the invention, it is intended that all matter contained herein be interpreted in an illustrative and not in a limiting sense.

I claim:

1. An electrical assembly for use on printed circuit boards comprising an insulating housing having means for retaining a resilient contact member therein, said housing comprising a hollow shell with apertured end walls, laterally spaced transversely yieldable side walls having opposed projections on their inner surface, the contact member includes a cylindrical portion with legs extending downwardly from opposed ends, arcuate shoulders extending laterally from said legs adapted for snap engagement with internal flanges at the terminal ends of said side walls.

2. An electrical assembly as set forth in claim 1 where said cylindrical portion is bifurcated by a longitudinal slot whereby said cylindrical portion may resiliently expand to accommodate an electrical probe.

3. A test jack for use with printed circuits comprising in combination a resilient insulating housing and a flexible probe receptacle positioned therein, said housing including an open bottomed hollow shell, apertured end walls and laterally spaced transversely yieldable side walls having a plurality of projections on the inner surface thereof, said side walls having their free ends extending toward but spaced from each other; said female probe receptacle comprising a cylindrical conductor having the upper surface bifurcated by a longitudinal slot and legs extending downward from said cylindrical conductor with arcuate shoulders formed therein and cooperatively disposed for snap engagement with the free ends of said side walls.

4. An electrical assembly for use on a printed circuit board comprising an insulating housing and a tubular probe receptacle, said housing comprising a hollow shell with apertured end walls, laterally spaced transversely yieldable side walls having opposed projections on their inner surface, said end walls having downwardly extending guide members for axial insertion within said printed circuit board, said probe receptacle including a hollow resilient cylindrical portion with legs extending downwardly from opposed ends, said cylindrical portion adapted for cooperate snap engagement within said housing and retention therein by said projections.

5. An electrical assembly as set forth in claim 4 where said tubular probe receiving portion has a plurality of spaced longitudinal slots about the periphery, one of said slots extending the length of said tubular portion enabling said tubular portion to resiliently expand upon insertion of a probe.

References Cited in the file of this patent

UNITED STATES PATENTS

| 2,422,265 | Squires | June 17, 1947 |

FOREIGN PATENTS

| 391,288 | Great Britain | Apr. 27, 1933 |
| 773,889 | Great Britain | May 1, 1957 |